United States Patent [19]

Wako

[11] Patent Number: 4,575,796
[45] Date of Patent: Mar. 11, 1986

[54] INFORMATION PROCESSING UNIT

[75] Inventor: Ikutaro Wako, Tokyo, Japan

[73] Assignee: Nippon Electric Co., Ltd., Tokyo, Japan

[21] Appl. No.: 701,269

[22] Filed: Feb. 13, 1985

Related U.S. Application Data

[63] Continuation of Ser. No. 341,952, Jan. 22, 1982, abandoned.

[30] Foreign Application Priority Data

Jan. 22, 1981 [JP] Japan ................................. 56-8469

[51] Int. Cl.[4] .............................................. G06F 7/14
[52] U.S. Cl. .................................................. 364/200
[58] Field of Search ... 364/200 MS File, 900 MS File

[56] References Cited

U.S. PATENT DOCUMENTS

| 4,267,581 | 5/1981 | Kobayashi et al. | 364/400 |
| 4,371,928 | 2/1983 | Barlow et al. | 364/200 |
| 4,378,591 | 3/1983 | Lemay | 364/200 |

Primary Examiner—Gareth D. Shaw
Assistant Examiner—S. Jaser
Attorney, Agent, or Firm—Sughrue, Mion, Zinn, Macpeak, and Seas

[57] ABSTRACT

An information processing unit designed for operating on N-bit bytes is capable of handling 2N-bit bytes in parallel. Control multiplexers selectively switch the connections between read and write buffers and a pair of bus lines. When 2N-bit processing is needed the multiplexers alter the connection between the bus lines and the buffers. The altered connection plus other normal buffer to bus line connections permit an increase in the data length that can be read or written simultaneously.

3 Claims, 4 Drawing Figures

INFORMATION PROCESSING UNIT

This is a continuation of application Ser. No. 341,952 filed 1-22-82, which is abandoned.

BACKGROUND OF THE INVENTION

The present invention relates to an information processing unit, and more particularly, to an information processing unit which manipulates a plurality of bits as the unit of processing information, such as 4-bit microprocessor, 8-bit microprocessor, etc.

The prior art information processing unit, for example 4-bit microprocessor, is constructed such that an input portion of a memory is connected to an output portion of a register by 4 bit signal lines, and an output portion of the memory is connected to an input portion of the register by 4 bit signal lines. Information is output, as 4-bit signals, from the memory by addressing and transferred to the register through the 4 bit signal lines to be set therein, simultaneously, and vice versa. In this event, the register consists of a 4-bit latch circuit (four flip-flop circuits). However, the information processing unit includes such circuits that manipulate information consisting of more than 4 bits, e.g., 8 bits. Examples of such circuits are a counter circuit, an accumulator circuit and two registers for loading two bytes of data. They are 8-bit processing circuits in which 8-bits of information are simultaneously manipulated. Input and output portions of these circuits should be connected to 4-bit processing circuits (for example, the above-mentioned memory) via 4-bit signal lines. Therefore, in the prior art information unit, the 8-bit information must be divided into two groups of 4-bit information, each transferred sequentially between the memory and the 8-bit processing circuits. Therefore, transfer is required twice and execution of a transferring instruction has to be repeated by spending at least two machine cycles in order to transfer the 8-bit information. As a result, information transferring speed is very slow in the prior art 4-bit microprocessor. There is a similar disadvantage in the 8-bit microprocessor necessitating 16-bit manipulation.

On the other hand, as the memory in the 4-bit microprocessor is designed such that 4 bits of information are simultaneously written in and/or read out by one memory accessing with one memory address, it is impossible to write in and/or read out 8 bits of information in parallel to and/or from the memory. Namely, in the prior art 4-bit microprocessor the number of signal lines is equal to the minimum unit of processing information (4 bits), and especially the number of signal lines for information transferring depends on the number of memory information accessed by one addressing. Such problems also arise in other information processing units which manipulate more than 4 bits of information as the unit of processing information.

Moreover, where an information processing unit is controlled by instructions with variable bit length (for example one byte instruction, two bytes instruction, three bytes instruction, etc.), accessing and transferring time for the instruction is very long because of the necessity of a plurality of memory accesses. For instance, three addressing sequences are required to read out a three byte instruction from a memory, that is, at least three machine cycles are spent for a memory access operation. As a result, not only does the processing speed become low, but also programming for memory access becomes complex.

SUMMARY OF THE INVENTION

One object of the present invention is to provide an information processing unit which manipulates at a high speed information group having a larger number of bits than the minimum unit of processing information.

Another object of the present invention is to provide an information processing unit having control means for transferring information of many bits in parallel to signal lies by one accessing step.

Still another object of the present invention is to provide an information processing unit which can control information of variable bit length in a short time.

According to the present invention, an information processing unit comprises a first signal bus on which information can flow, a second signal bus on which information can flow, first storing means for storing first information coupled to said first signal bus, second storing means for storing second information, coupling means for coupling either one of the first signal bus and the second signal bus to the second storing means, means for generating first and second control signals, means for accessing the first and/or second storing means to read out information, and control means for controlling the coupling means so as to couple the second storing means to the first signal bus when either one of the first and second storing means is accessed by the accessing means and to couple the second storing means to the second signal bus when both the first and second storing means are accessed at the same time by the accessing means.

In the information processing unit according to the present invention, first information stored in the first storing means is transferred through the first signal bus, and second information stored in the second storing means is transferred through the first and second signal buses. Selection of these buses on which second information flow is executed by the control means is in response to the accessing means.

Where the accessing means accesses either one of the first storing means and second storing means, the second storing means is coupled to the first signal bus. As a result, first and second information is transferred through the first signal bus. Especially, when the first storing means and the second storing means are accessed alternately by the accessing means, information of the first and second storing means are sequentially transferred through the first signal bus. This is a first operation mode that the information processing unit manipulates first or second information as the minimum unit of processing information.

On the other hand, in the case that the accessing means accesses both the first and second storing means simultaneously, the first storing means is coupled to the first signal bus, and the second storing means is coupled to the second signal bus under control of the control means. As a result, while the first information is transferred through the first signal bus, the second information is also transferred through the second signal bus. Both the first and second storing means are accessed at the same time, and the first information and the second information are simultaneously read out and transferred through the first and second signal buses, respectively. This is a second operation mode in which the information processing unit manipulates a long, added information of the first information and the second information as the unit of processing information. It is noted that such a long information including the first and second information can be controlled at a high speed by one accessing as well as a short information comprising the first information or the second information. Therefore, according to the information processing unit of the present invention, information processing of variable information length can be achieved at a very high speed. Of course, when the coupling means controlled by the control means is adapted to an input stage of the second storing means, information of variable length is stored in the first storing means and the second storing means at a high speed (for example, within one machine cycle).

Moreover, in the case that an information processing unit includes a 4-bit memory, such as a read only memory (ROM) or a random access memory (RAM), as a first storing means and a second storing means, more than 4-bit information (for example 8-bit) can be read out and/or written in at a high speed as well as 4-bit information manipulation. In the prior art when 8 bits of data stored in the 4-bit memory are set in an 8-bit counter, the 4-bit memory must be accessed two times. However, in the information processing unit of the present invention, 8-bits of data are simultaneously read out from the 4-bit memory and are set in the 8-bit counter through the first and second signal bus within about half the time of the prior art.

BRIEF DESCRIPTION OF THE DRAWINGS

The above-mentioned and other objects, features and advantages of the present invention will become more apparent by reference to the following description of a preferred embodiment of the invention in conjunction with the accompanying drawings, wherein.

DETAILED DESCRIPTION OF THE INVENTION

Figure 1:
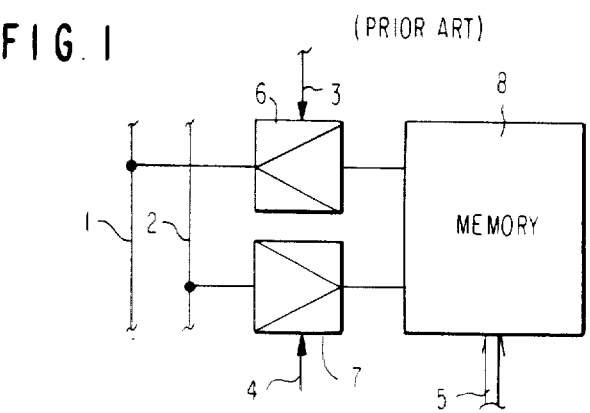
FIG. 1 is a block diagram of a memory and buses in the prior art information processing unit.

Now description will be made on construction and operation of an information processing unit in the prior art with reference to FIG. 1. FIG. 1 shows a memory section and a transferring section of a 4-bit microprocessor. There are two buses 1 and 2, each of which comprises 4 bit signal lines. A memory 8 is a RAM coupled to an address bus 5, a read buffer 6 and a write buffer 7. The read buffer 6 is activated by a read command signal 3, and the write buffer 7 is activated by a write command signal 4. These read and write command signals are generated by decoding a read instruction and a write instruction, respectively. Information read out from or written into the RAM 8 is in units of 4 bits. That is, 4 bits of data are simultaneously accessed by one addressing operation. The 4-bits of data output from the RAM 8 by an addressing operation are transferred in parallel to the bus 1 via the read buffer 6 in response to the read command signal 3. On the other hand, 4 bits of data on the bus 2 are written in parallel at four memory cell locations in the RAM 8 designated by an address via the write buffer 7 in response to the write command signal 4.

The information processing unit of the prior art can manipulate 4 bits of data as the unit of processing. However, data which is longer than 4 bits in length can not be read out and written in the RAM 8, simultaneously. Therefore, when, for example, 8 bit data transferring is required, two data transfers must be executed. This is a big disadvantage in an information processing unit which requires high speed processing.

Figure 2:
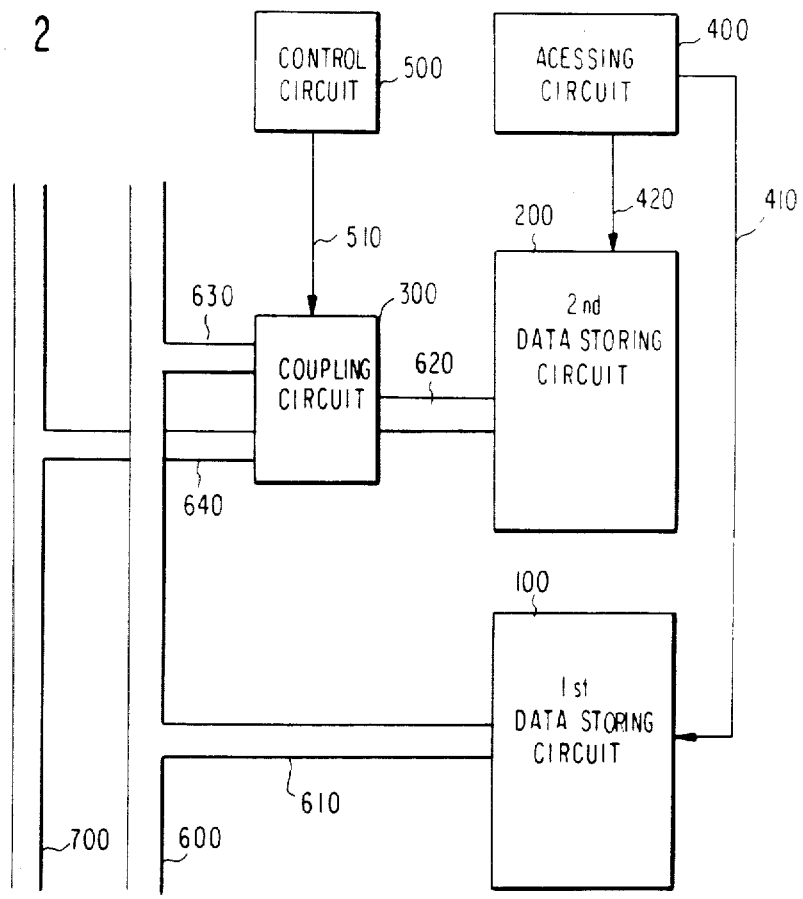
FIG. 2 is a block diagram of information storing means, bus and control means of an information processing unit according to one preferred embodiment of the present invention.

Referring to FIG. 2 which shows a block diagram of an information processing unit according to one preferred embodiment of the present invention, each of first data storing circuit 100 and second data storing circuit 200 stores 4 bits of data. First bus 600 and second bus 700 are 4 bits signal lines. The first data storing circuit 100 is connected to the first data bus 600 by a data bus 610 including 4 signal lines, and the second data storing circuit 200 is connected to a coupling circuit 300 by a data bus 620 including 4 signal lines. The coupling circuit 300 is connected to the first bus 600 and the second bus 700 by two data buses 630 and 640, respectively. A control circuit 500 generates a control signal 510 for designating the coupling condition. For example, when the control signal 510 is a high voltage level, the data bus 620 is coupled to the data bus 630. On the other hand, when control signal 510 is a low voltage level, the data bus 620 is coupled to the data bus 640. An accessing circuit 400 generates control signals 410 and 420 for reading out 4 bit of data from the first data storing circuit 100 and the second data storing circuit 200. These control signals 410 and 420 may be generated independently of each other or simultaneously. Further, when the control signals 410 and 420 are generated at the same time, the control signal 510 with the low voltage level is applied to the coupling circuit 300, and as a result the data bus 620 is coupled to the data bus 640. On the other hand, when the control signal 410 and the control signal 420 are applied to the first and second data storing circuits 100 and 200, independently, the control signal 510 with the high voltage level is applied to the coupling circuit 300.

The information processing unit shown in FIG. 2 operates as follows. In the case that the control signal 410 and the control signal 420 are applied to the first and second data storing circuit 100 and 200, independently, the data bus 620 is coupled to the data bus 630. That is, the first and the second data storing circuits 100 and 200 are coupled to the first bus 600 in common, and each 4 bits of data in the first and the second data storing circuits 100 and 200 is transferred through the first bus 600 in response to the control signals 410 and 420. In this event, of course, as the control signals 410 and 420 are not applied to the first and second data storing circuits 100 and 200 simultaneously, confusion of the data of the first data storing circuit 100 and the data of the second data storing circuit 200 does not occur.

Further, in the case that the control signals 410 and 420 are simultaneously applied to the first and the second data storing circuits 100 and 200, the data bus 620 is coupled to the data bus 640. That is, the first data storing circuit 100 is coupled to the first bus 600, and the second data storing circuit 200 is coupled to the second bus 700. As the control signals 410 and 420 are simultaneously applied to the first and the second data storing circuits 100 and 200, each 4 bits of data of the first and the second data storing circuits 100 and 200 is read out at the same time to the data bus 610 and the data bus 620, respectively. In this event, while the data of the first data storing circuit 100 is transferred through the first bus 600, the data of the second data storing circuit 200 is transferred through the second bus 700. Therefore, two groups of 4-bit data (8 bits of data) are controlled at the same time by only one accessing.

As above described, the information processing unit of the present invention can manipulate information of variable bit length at a high speed. Further, manipulation of data having a long bit length is very easy and a design of the information processing unit is very simple as illustrated in FIG. 2. In a microprocessor, a timing control circuit can be used instead of the control circuit 500, and a decoder circuit can be used instead of the accessing circuit 400. Further, a switching circuit, a multiplexer, or the like, can be used for the coupling circuit 300.

Figure 3:
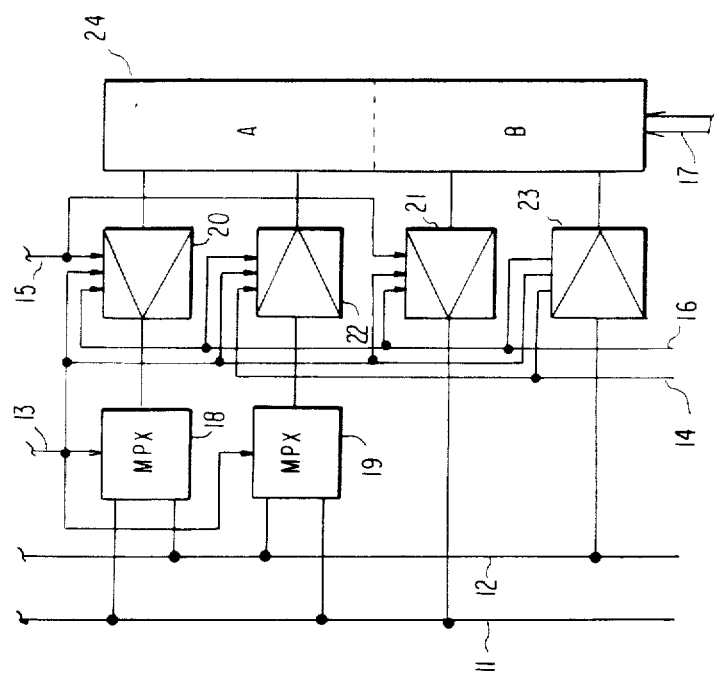
FIG. 3 is a block diagram of a memory, bus and control circuit of an information processing unit according to another preferred embodiment of the present invention.

Referring to FIG. 3 which shows a block diagram of an information processing unit in which a memory (RAM) is coupled to a bus via read and write buffers according to another embodiment of the present invention, a memory (RAM) 24 is divided into two groups A and B. Group A is accessed by odd addresses, and group B is accessed by even addresses. That is, the RAM 24 is divided into two groups A and B by addresses. Output portions of the groups A and B are connected to read buffers 20 and 21, and input portions of them are connected to write buffers 22 and 23, respectively. The read buffer 21 of the group B is coupled to a first bus (N bit) 11, directly, and the write buffer 23 of the group B is coupled to a second bus (N bit) 12 directly. On the other hand, the read buffer 20 and the write buffer 22 are coupled to both the first and second buses 11 and 12 via coupling circuits 18 and 19, respectively. In this embodiment, multiplexers are used for the coupling circuits 18 and 19. A control signal 13 (equal to the control signal 510 in FIG. 2) is applied to the multiplexers 18 and 19 and the read and write buffers 20, 21, 22 and 23 in common. A write command signal 14 is applied to the write buffers 22 and 23. A read command signal 15 is applied to the read buffers 20 and 21. These write and read command signals 14 and 15 are generated by decoding write and read instructions, respectively. In general, the read command signal 15 and the write command signal 14 are not generated simultaneously. The least significant bit (LSB) 16 of an address is applied to the read and write buffers 20, 21, 22 and 23 in common. The remainder bits 17 of the address are applied to the RAM 24, especially, these remainder bits 17 are commonly applied to both the group A and the group B. It is noted that bit length of data read out and written in the RAM 24 by addressing is N-bits. Namely, the number of signal lines of the first and the second buses 11 and 12 is equal to the number of bits of the data which is input and output to the RAM 24 in response to one address designation.

When an applied address is even, that is LSB 16 is "0", the read buffer 21 and the write buffer 23 are selected and activated. In this event, the read buffer 20 and the write buffer 22 are not selected and not activated. As the result, the group B of the RAM 24 is coupled to the first bus 11 and the second bus 12. On the other hand, when an address is odd, that is LSB 16 is "1", the read buffer 20 and the write buffer 22 are selected and activated, and then the group A of the RAM 24 is coupled to the first bus 11 and the second bus 12 via the multiplexers 18 and 19. Here, the read and write buffers 20 and 22 are activated by low voltage level ("0"), and the read and write buffers 21 and 23 are activated by high voltage level ("1"). If circuits of the read and write buffers 20 and 22 are the same circuits of the read and write buffers 21 and 23, LSB 16 is applied to the read and write buffers 20 and 22 is inverted by inverters.

In the case that N-bit data is manipulated, the read buffer 20 is coupled to the first bus 11, and the write buffer 19 is coupled to the second bus 12. In this condition, when an even address is applied to the RAM 24, the group B is coupled to the first bus 11 and the second bus 12. Therefor, the N-bit data of the group B is read out and transferred to the first bus 11 in response to the read command signal 15. Further, the N-bit data on the second bus 12 is written at memory cell locations of the group B in response to the write command signal 14. On the other hand when an odd address is applied to the RAM 24, the read buffer 20 and the write buffer 22 are activated, so that the group A are coupled to the first bus 11 and the second bus 12. N-bit data in the group A is read out and transferred to the first bus 11 in response to the read command signal 15, and N-bit data on the second bus 12 is written at memory cell locations of the group A in response to the write command signal 14. The group A and the group B are alternately accessed by sequential addresses, and therefore read-out data of the RAM 24 is transferred through the first bus sequentially.

On the other hand when 2N-bit data is manipulated, the read buffer 20 is coupled to the second bus 12. Further, both the read buffers 20 and 21 are activated. As the result the RAM 24 is accessed by only the address 17 (not including LSB 16), each N-bit data of the groups A and B is simultaneously transferred to the second bus 12 and the first bus 11, respectively. Therefore, 2N-bit data is transferred through the buses 11 and 12 in parallel. Further, when the write command signal 14 is generated, the multiplexer 19 is coupled the first bus 11 to the write buffer 22 in response to the control signal 13, and therefore, each N-bit data on the first bus 11 and the second bus 12 is simultaneously written in the groups A and B of the RAM 24.

Figure 4:
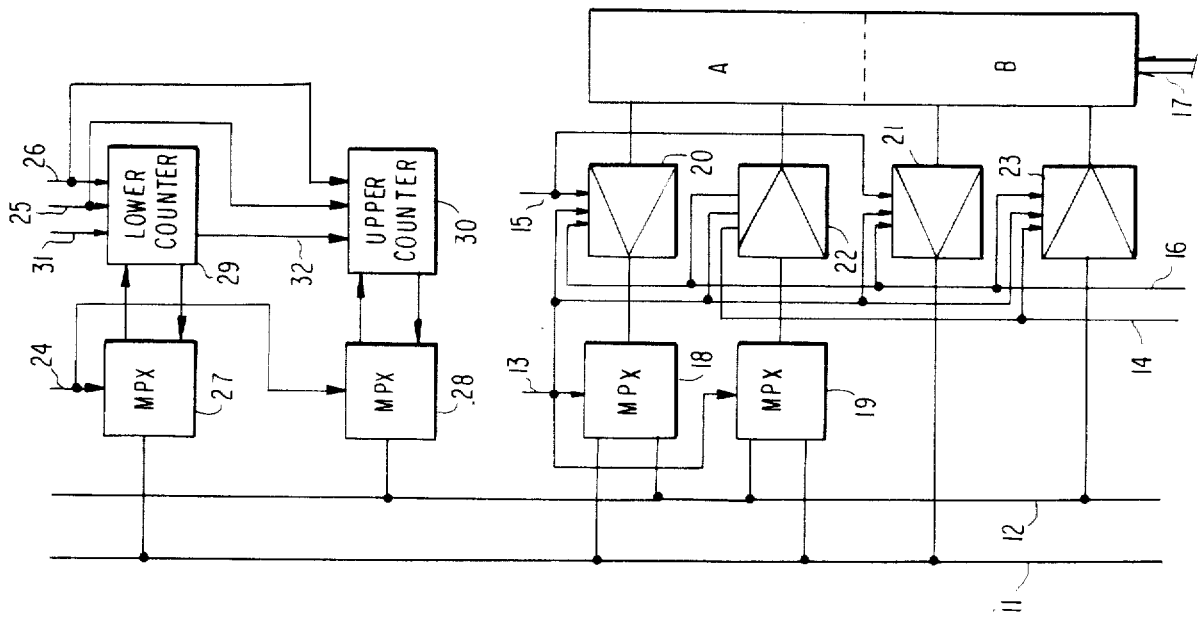
FIG. 4 is a block diagram showing one example of an information processing apparatus including a counter and the memory illustrated in FIG. 3.

FIG. 4 illustrates an example of the present invention wherein the information unit shown in FIG. 3 is coupled to a 2N-bit counter. An N-bit lower counter 29 and an N-bit upper counter 30 are coupled to the first bus 11 and the second bus 12 via multiplexers 27 and 28, respectively. The multiplexer 27 is controlled by an input/output command signal 24, so as to connect the first bus 11 to either ones of an input portion and an output portion of the lower counter 29. The multiplexer 28 is also controlled by the input/output command signal 24 as well as the multiplexer 27. An input signal 31 for count operation is applied to the lower counter 29, and a carry signal 32 of the lower counter 29 is input to an input signal terminal of the upper counter 30. A count start command signal 25 and a count stop command signal 26 are applied to the lower and upper counters 29 and 30 in common.

In this system shown in FIG. 4, N-bit data of the lower counter 29 and N-bit data of the upper counter 30 are simultaneously transferred to the first bus 11 and the second bus 12, respectively, and the 2N-bit data are set in parallel in the upper and the lower counter 29 and 30. Of course, the 2N-bit data are read into or out of the RAM 24 by one address designation. Therefore, data transferring processing can be executed at a high speed in the information processing unit of the present invention. Moreover, design of information processing system is very easy.

According to the present invention, an accumulator, a pair register (HL register), or the like, may be coupled to the information processing unit shown in FIG. 3.

What is claimed is:

1. An information processing unit of the type adapted for handling N-bit data in parallel, said unit comprising, first and second N-bit bus lines,
    a random access memory (RAM) having first and second halves,
    a first read buffer circuit for coupling N-bit data read from said first half of said RAM to said first bus line,
    a first write buffer circuit for coupling N-bit data from said second bus line into said first half of said RAM,
    a first multiplexer and a second multiplexer,
    a second read buffer circuit for coupling N-bit data read from said second half of said RAM to said first multiplexer, said first multiplexer being coupled to said first and second bus lines and operative to selectively couple N-bit data from said second read buffer to said first and second bus lines,
    a second write buffer for coupling N-bit data from said second multiplexer to be written into said second half of said RAM, said second multiplexer being coupled to said first and second bus lines and operative to selectively couple N-bit data from said first and second bus lines to said second write buffer, and
    control means for generating first, second and third control signals, N-bit data stored in said first half of said RAM being transferred to said first bus line through said first read buffer in response to said first control signal, N-bit data stored in said second half of said RAM being transferred to said first bus line through said second read buffer and said first multiplexer in response to said second control signal, 2N-bit data stored in said first and second halves of said RAM being simultaneously transferred to said first and second bus lines, respectively, in response to said third control signal such that N-bit data stored in said first half of said RAM is transferred through said first read buffer to said first bus line and N-bit data stored in said second half of said RAM is transferred through said second read buffer and said first multiplexer to said second data bus, N-bit data on said first bus line being written into said first half of said RAM through said first write buffer in response to said first control signal, N-bit data on said first bus line being written into said second half of said RAM through said second multiplexer and said second write buffer in response to said second control signal, 2N-bit data on said first and second bus lines, respectively, being simultaneously written into said first and second halves of said RAM in response to said third control signals such that the N-bit data on said first bus line is transferred through said first write buffer to said first half of said RAM, and the N-bit data on said second bus line is transferred through said second multiplexer and said second write buffer to said second half of said RAM.

2. An information processing unit comprising a first data bus for transferring information, a second data bus for transferring information, first storing means for storing information, second storing means for storing information, a first connection bus coupling said first storing means to said first data bus, coupling means inserted between said first and second data buses and said second storing means, a second connection bus coupling said first data bus to said coupling means, a third connection bus coupling said second data bus to said coupling means, a fourth connection bus coupling said coupling means to said second storing means, accessing means coupled to said first storing means and said second storing means and generating first, second and third access signals, and control means coupled to said coupling means, said first storing means transferring information stored therein to said first data bus through said first connection bus in response to said first access signal and said third access signal, said control means controlling said coupling means such that information stored in said second storing means is transferred to said first data bus through said fourth connection bus and said second connection bus in response to said second access signal at a different time from a time when information stored in said first storing means is transferred to said first data bus in response to said first access signal, and information stored in said second storing means is transferred to said second data bus through said fourth connection bus and said third connection bus in response to said third access signal at the same time as information stored in said first storing means is transferred to said first data bus through said first connection bus in response to said third access signal.

3. The unit as claimed in claim 2, in which said first storing means is directly coupled only to said first data bus via a buffer circuit.

* * * * *